(12) United States Patent
Syben et al.

(10) Patent No.: US 9,373,004 B2
(45) Date of Patent: *Jun. 21, 2016

(54) METHODS AND SYSTEMS FOR DELETING REQUESTED INFORMATION

(71) Applicant: Google Inc., Mountain View, CA (US)

(72) Inventors: Joanne Syben, Mountain View, CA (US); Matthew Thomas Harren, Sunnyvale, CA (US); Algis Pranas Rudys, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,622

(22) Filed: Oct. 30, 2015

(65) Prior Publication Data
US 2016/0048699 A1   Feb. 18, 2016

Related U.S. Application Data

(63) Continuation of application No. 14/173,931, filed on Feb. 6, 2014, now Pat. No. 9,189,641.

(51) Int. Cl.
| | | |
|---|---|---|
| *G06F 21/00* | (2013.01) | |
| *G06F 21/62* | (2013.01) | |
| *G06F 17/30* | (2006.01) | |
| *H04L 9/08* | (2006.01) | |

(52) U.S. Cl.
CPC ...... *G06F 21/6227* (2013.01); *G06F 17/30085* (2013.01); *G06F 17/30321* (2013.01); *G06F 17/30528* (2013.01); *G06F 21/6209* (2013.01); *H04L 9/0894* (2013.01); *G06F 2221/2143* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 7,266,546 B2 * | 9/2007 | Son | G06F 17/30876 |
| 7,440,960 B2 | 10/2008 | Schwartz et al. | |
| 7,685,181 B2 | 3/2010 | Bhattacharjee et al. | |
| 8,041,985 B2 | 10/2011 | Callaway et al. | |
| 8,316,460 B1 | 11/2012 | Wang et al. | |
| 8,464,350 B2 | 6/2013 | Kanevsky et al. | |
| 8,660,988 B2 | 2/2014 | Brantner et al. | |
| 9,002,018 B2 | 4/2015 | Wilkins et al. | |
| 2003/0093429 A1 * | 5/2003 | Nishikawa | G06F 17/30595 |
| 2005/0050019 A1 * | 3/2005 | Schwartz | G06F 17/30595 |
| 2006/0224583 A1 * | 10/2006 | Fikes | G06F 17/30876 |

(Continued)

OTHER PUBLICATIONS

Reardon et al., "SoK: Secure Data Deletion", 2013 IEEE Symposium on Security and Privacy, May 19, 2013, pp. 301-315.

*Primary Examiner* — Morshed Mehedi
(74) *Attorney, Agent, or Firm* — Fox Rothschild LLP

(57) ABSTRACT

A method of deleting log records may include identifying a plurality of log records generated during a time period, for each identified log record, determining whether a delete request associated with the log record has been made, and, in response to determining that a delete request has not been received, identifying a unique identifier associated with the log record, searching a user activity table for an entry having a key table index associated with the unique identifier, where the entry is associated with a timestamp, using the key table index and the timestamp to identify a key associated with the unique identifier and the timestamp from a key table, encrypting at least a portion of the log record with the identified key to generate an encrypted value, and storing the encrypted value as an entry in the log record database that is associated with the identified log record.

18 Claims, 8 Drawing Sheets

(56) References Cited

U.S. PATENT DOCUMENTS

| | | | |
|---|---|---|---|
| 2008/0208802 A1* | 8/2008 | Bhattacharjee | G06F 17/30327 |
| 2008/0219445 A1* | 9/2008 | Yato | H04L 63/1408 380/255 |
| 2009/0177658 A1* | 7/2009 | Brantner | G06F 17/30551 |
| 2010/0017647 A1* | 1/2010 | Callaway | G06F 11/1641 714/4.12 |
| 2011/0055559 A1 | 3/2011 | Li et al. | |
| 2012/0204032 A1* | 8/2012 | Wilkins | H04L 9/006 713/170 |

\* cited by examiner

fill …

METHODS AND SYSTEMS FOR DELETING REQUESTED INFORMATION

CROSS-REFERENCE TO RELATED APPLICATIONS

This application claims priority to and is a continuation of U.S. patent application Ser. No. 14/173,931 filed Feb. 6, 2014, entitled METHODS AND SYSTEMS FOR DELETING REQUESTED INFORMATION, the disclosure of which is incorporated herein by reference in its entirety.

BACKGROUND

The increased use of social media, mobile devices and personal-assistant type services has made preserving user anonymity in logged data more complex. As logs are accumulated, a deletion pipeline is presented with an ever-expanding corpus of data. Data may need to be processed and/or deleted within a certain time period pursuant to a user-requested deletion or other policy which further complicates the deletion process.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of deleting log records may include identifying, by a computing device from a log record database, a plurality of log records generated during a time period. Each log record may correspond to a user activity. The method may include, for each identified log record, determining, by the computing device, whether a delete request associated with the log record has been made, and, in response to determining that a delete request has not been received, identifying a unique identifier associated with the log record, searching a user activity table for an entry having a key table index associated with the unique identifier, where the entry is associated with a timestamp, using the key table index and the timestamp to identify a key associated with the unique identifier and the timestamp from a key table, encrypting, by the computing device, at least a portion of the log record with the identified key to generate an encrypted value, and storing the encrypted value as an entry in the log record database that is associated with the identified log record.

In an embodiment, a system of deleting log records may include a computing device, and a computer-readable storage medium in communication with the computing device. The computer-readable storage medium may include one or more programming instructions that, when executed, cause the computing device to identify a plurality of log records generated during a time period. Each log record may correspond to a user activity. The computer-readable storage medium may include one or more programming instructions that, when executed, cause the computing device to, for each identified log record, determine whether a delete request associated with the log record has been made, in response to determining that a delete request has not been received, identifying a unique identifier associated with the log record, searching a user activity table for an entry having a key table index associated with the unique identifier, where the entry is associated with a timestamp, using the key table index and timestamp to identify a key associated with the unique identifier and the timestamp from a key table, encrypting, by the computing device, at least a portion of the log record with the identified key to generate an encrypted value, and storing the encrypted value as an entry in the log record database that is associated with the identified log record.

DETAILED DESCRIPTION

The following terms shall have, for purposes of this application, the respective meanings set forth below:

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like. When used in the claims, reference to "a computing device" may include a single device, or it may refer to any number of devices having one or more processors that communicate with each other and share data and/or instructions to perform the claimed steps.

A "log record" refers to information pertaining to one or more user activities. A log record may be an electronic record or file.

A "service provider" refers to a provider of one or more electronic services. Example service providers may include, without limitation, social networking service providers, email service providers, search engine service provider, and/or the like.

"User data" refers to data or information associated with a user, an action or activity of a user in connection with a service, a user account and/or the like.

A "user identifier" may be a unique identifier associated with a user of a service.

Figure 1:
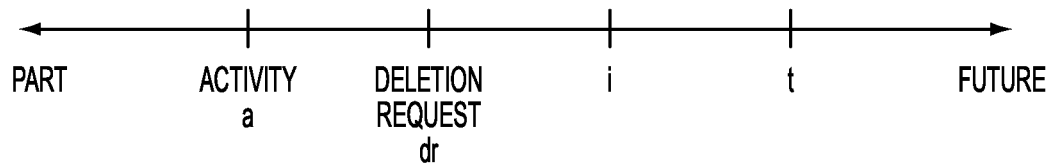
FIG. 1 illustrates an example timeline of a deletion request according to an embodiment.

A service provider may receive requests from a user to delete at least a portion of the user's user data. The service provider may have a policy in place that any user-requested delete requests be fully honored within a certain period of time (t) relative to the user deletion request (dr). As such, log records related to a delete request must be deleted within t days of the request. In addition, in order to allow an analysis interval (i) to support for example, quality and fraud prevention, a service provider's policy may specify that the deletion process cannot delete log records associated with activity (a) until they are at least i days old. As such, the deletion process must ensure that for every activity, a, the associated log records will be deleted no sooner than dr+i and no later than dr+t. FIG. 1 illustrates an example timeline of a deletion request according to an embodiment.

Figure 2:
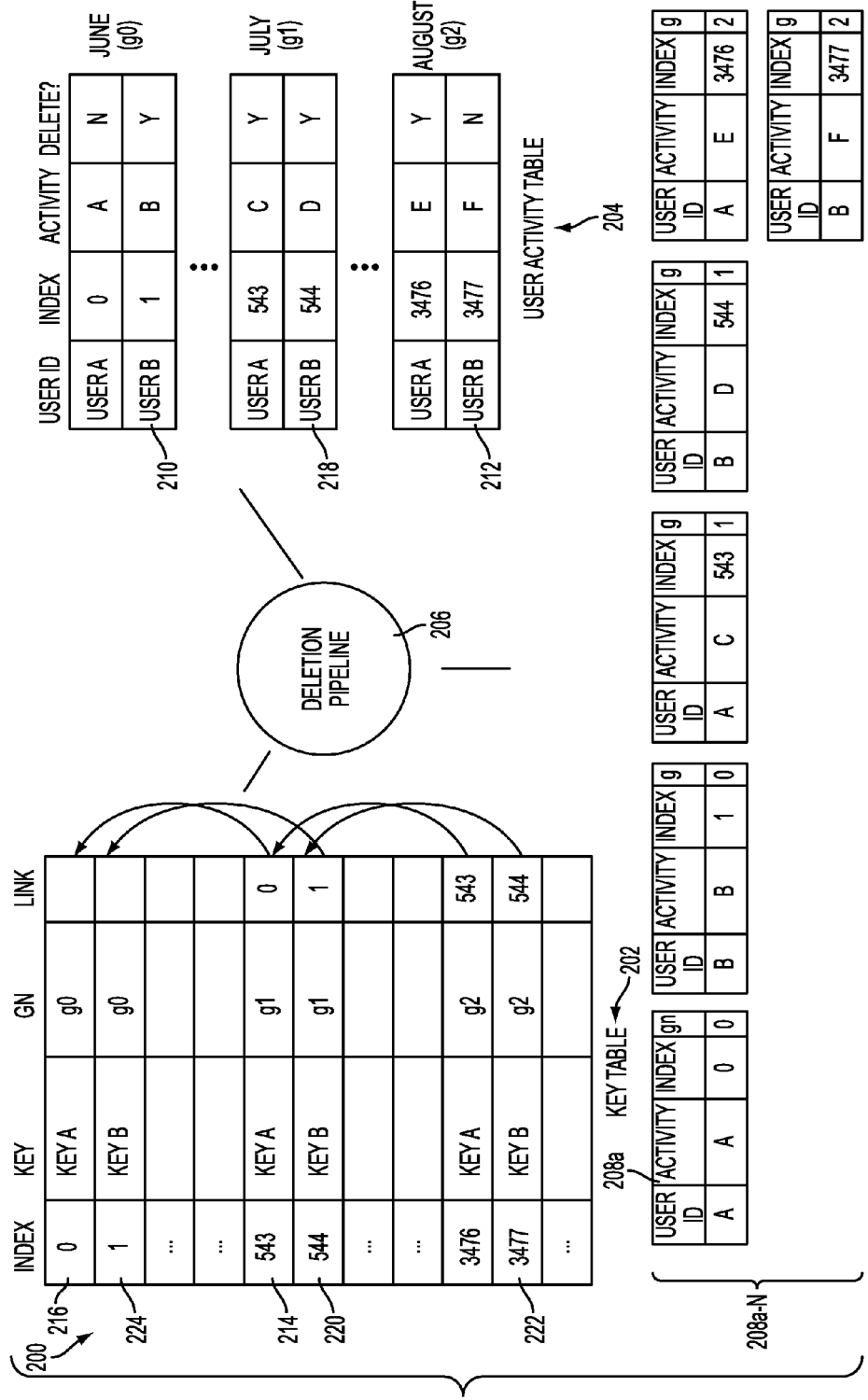
FIG. 2 illustrates a block diagram of an example deletion system according to an embodiment.

FIG. 2 illustrates a block diagram of an example deletion system according to an embodiment. As illustrated by FIG. 2, the system 200 may include a key table 202, a user activity table 204, a deletion pipeline 206 and one or more log records 208. A key table 202 may be a data structure configured to store one or more keys associated with one or more user identifiers.

In an embodiment, a key table 202 may be a flat, singly-linked table that is indexed sequentially and contains a key field. The keys may not be unique or consistently tied to a particular user identifier, but may be randomly generated. In an embodiment, a key table 202 may include a generation number that corresponds to a particular run of the deletion pipeline. Although referred to in this disclosure as a key table, alternate types of data structures such as, for example, databases, arrays and/or the like may be used within the scope of this disclosure.

A user activity table 204 may be a data structure configured to store one or more user activities keyed by user identifier. In an embodiment, a user activity table 204 may store delete requests made by one or more users. In an embodiment, one or more entries of a user activity table 204 may be associated with a timestamp, such as, for example, a generation number.

In an embodiment, a deletion pipeline 206 may be a process that reaps one or more delete requests from the user activity table 204 and applies them to the log records 208. A log record may be a table, a database, and array and/or the like configured to store information about one or more user activities in connection with a user account or services of a service provider. In an embodiment, a log record may store a user identifier, a timestamp or other indication of when the activity occurred and/or the like.

In certain embodiments, a key table, a user activity table and one or more log records may be stored in memory associated with one or more computing devices. In an embodiment, a key table, a user activity table and log records may be stored in memory associated with the same computing device. Alternatively, a key table, a user activity table and log records may be stored in memory associated with different computing devices that communicate with one another via one or more communication networks. A communication network may be a local area network (LAN), a wide area network (WAN), a mobile or cellular communication network, an extranet, an intranet, the Internet and/or the like.

Similarly, a deletion pipeline may be run by a computing device that is associated with a key table, a user activity table and/or log records. Alternatively, a deletion pipeline may be run with a computing device separate from the computing device(s) associated with a key table, a user activity table and/or log records.

Figure 3:
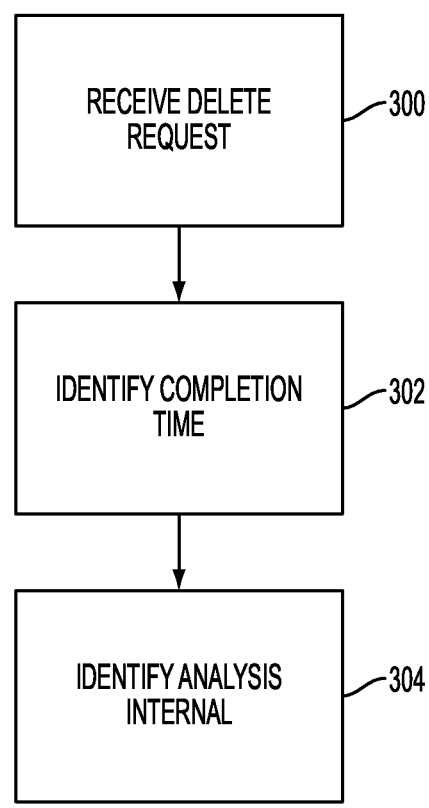
FIG. 3 illustrates a flow chart of an example method of deleting user data according to an embodiment.

FIG. 3 illustrates a flow chart of an example method of deleting user data according to an embodiment. As illustrated by FIG. 3, a delete request may be received 300. A delete request may be received 300 from a user, and may pertain to one or more user activities in connection with a service or service provider. For example, a user may request that a query the user performed be deleted by a search engine. As another example, a user may request that the user's entire search history for the search engine be deleted. As other examples, a delete request may include a request that information associated with a user account be deleted, or that an entire user account be deleted. If a service provider is an email provider, a delete request may request that one or more email messages be deleted. Additional and/or alternate delete requests may be used within the scope of this disclosure.

A received delete request may be stored in a user activity table along with a user identifier associated with the user who made the request. A user activity table may be associated with a timestamp. For example, referring to FIG. 2, the user activity table includes an entry 210 associated with User-id B for June that corresponds to a delete request that requests the deletion of Activity B.

Referring back to FIG. 3, a completion time may be identified 302. A completion time, t, may be a time period within which a service provider is to fulfill a user delete request. For example, if t=60 days, then the data associated with a delete request must be deleted within no more than 60 days from the date the delete request is made.

In an embodiment, an analysis interval time, i, may be identified 304. An analysis interval time may indicate a time period during which one or more log records are to be preserved after receiving a delete request. For example a service provider may have a policy that one or more log records associated with a delete request are to be preserved for at least 30 days after a delete request is received. As such, an analysis interval time may be 30 days after a delete request is received.

As an example, an analysis interval may be 30 days, a completion time may be 60 days, and a deletion pipeline may be run on July 1. As such, a log record for which a delete request was made on June 1 must be deleted no later than August 1. The analysis interval may be honored as well, so beginning the deletion pipeline on July 1 allows 30 days of recovery time from faults for each delete request affecting logs dated June 30 or older. In an embodiment, only one day of logs may be processed per day of the analysis interval. For example, the system may process logs dated June 1 on July 1, may process logs dated June 2 on July 2 and so on.

In an embodiment, if an error occurs during the deletion process, the process may catch-up on log records by processing multiple days' worth of log records on a single day. For example, log records from June 12, 13, 14 and 15 may be processed on July 15.

Figure 4:
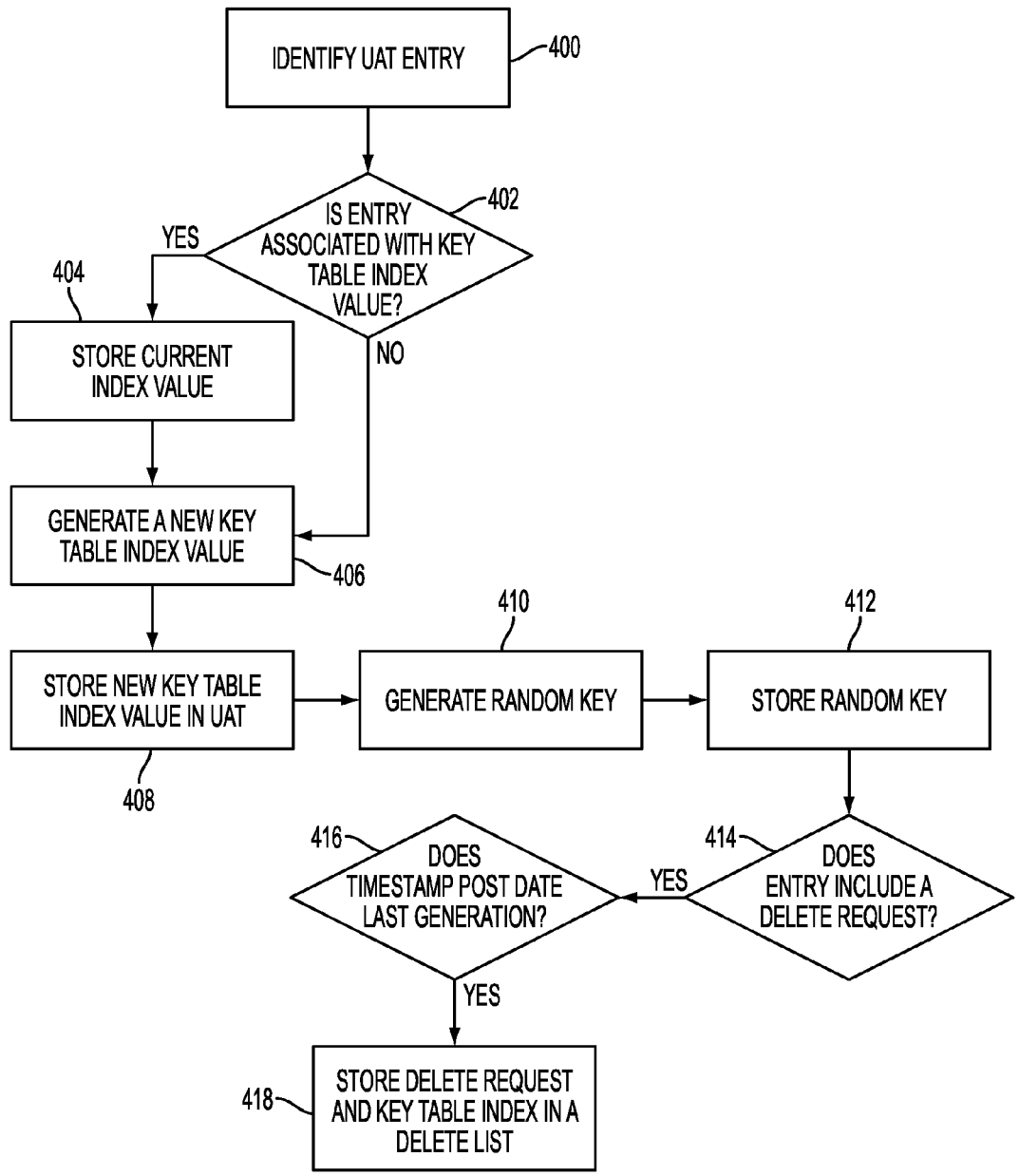
FIG. 4 illustrates a flow chart of an example method of generating one or more keys and creating a delete list according to an embodiment.

FIG. 4 illustrates a flow chart of an example method of generating one or more keys and creating a delete list according to an embodiment. In an embodiment, an index may be generated for each entry in the user activity table. Each index may have a unique value, and may correspond to an entry in the key table. An index may have a numerical value that may be generated using an incrementing counter. The user activity table 204 illustrated in FIG. 2 shows a snapshot of two rows of the table over a period of three months (June, July and August). As illustrated by FIG. 2, each row or entry is associated with an index value and a corresponding timestamp (e.g., June, July or August). For example, the table entry 210 associated with User-id B for June corresponds to an index of '1', while the updated table entry 212 associated with User-id B for August corresponds to an index of '3477'.

In an embodiment, an entry in the user activity table may be identified 400. It may be determined 402 whether the identified entry is already associated with a key table index value. If an entry in the user activity table is already associated with a key table index value, the current index value may be stored 404 and identified as the value of the previous index. For example, a key table index value may be stored 404 in a temporary variable called "prev-index." A new key table index value may be generated 406 for the entry, and the new a key table index value may be stored 408 in the user activity table so that it is associated with the entry. In an embodiment, the new a key table index value may be stored 408 in the user activity table in place of the previous index value.

If the entry is not already associated with a key table index value, then a new key table index value may be generated 406 for the entry, and the new key table index value may be stored 408 in the user activity table so that it is associated with the entry.

In an embodiment, a random key may be generated 410 for the entry of the user activity table and stored 412 in the key table such that it corresponds to the associated key table index of the user activity table. For example, the user activity table entry 210 associated with User-id B for June corresponds to an index of '1'. As illustrated in FIG. 2, random key Key B may be generated 410 for this user activity table entry 210 and stored 412 in the key table such that it corresponds to the index '1'.

In an embodiment, the key table may also store a timestamp, such as, for example, a generation number, associated with one or more user activity table entries. A generation number may refer to a timestamp associated with an entry in the user activity table such as, for example, a day, a week, a month and/or the like. In an embodiment, a generation number may correspond to a time period during which a corresponding delete request is made. For example, the generation numbers illustrated in FIG. 2 represent months, with g0 representing June, g1 representing July and g2 representing August. As such, the delete request associated with User-id A and g0 is a delete request made by the user associated with the identifier User-id A in June.

In an embodiment, one or more entries in the key table may include a back pointer. A back pointer may be a reference to one or more other entries in the key table. For example, a pointer may be a data type whose value refers to the index of another entry in the key table. A back pointer may reference one entry in the key table. When an entry in the key table is deleted, a corresponding back pointer may be adjusted to point to a different entry. In an embodiment, the stored previous index value for an entry may be stored in the key table as a back pointer to the previous generation key for the associated user.

In an embodiment, a back pointer may point from a certain entry in the key table to a previous entry in the key table that is associated with the same user identifier. In an embodiment, a back pointer may point to the next most recent entry in the key table that is associated with the same user identifier. For example, referring to FIG. 2, the entry 214 in the key table associated with an index value of 543 may include a back pointer to the entry 216 in the key table associated with an index value of 0 because this is the next most recent entry in the key table that is associated with the same user identifier, User-id A. If there is no previous entry in the key table that corresponds to the user identifier, then the entry may not include a back pointer as this entry may be considered the oldest entry associated with the user identifier.

It may be determined 414 whether the identified entry includes a delete request that has been made since the previous generation. For example, the deletion pipeline may determine 414 whether the identified entry includes a delete request. If it does, the deletion pipeline may determine 416 whether a timestamp associated with the delete request postdates the last generation or deletion pipeline analysis. If so, the deletion pipeline may store 418 the delete request and the key table index associated with the entry in a delete list. A delete list may be a time-ordered list of delete requests. In an embodiment, a delete list may be ordered from oldest requests to newest requests. In an embodiment, a deletion list may be any suitable data structure such as, for example, a table, a chart, a database, a list and/or the like.

In an embodiment, one or more of the steps of FIG. 4 may be repeated for one or more entries of the user activity table. For example, each of the steps of FIG. 4 may be repeated on each entry of a user activity table until all entries have been considered.

Figure 5:
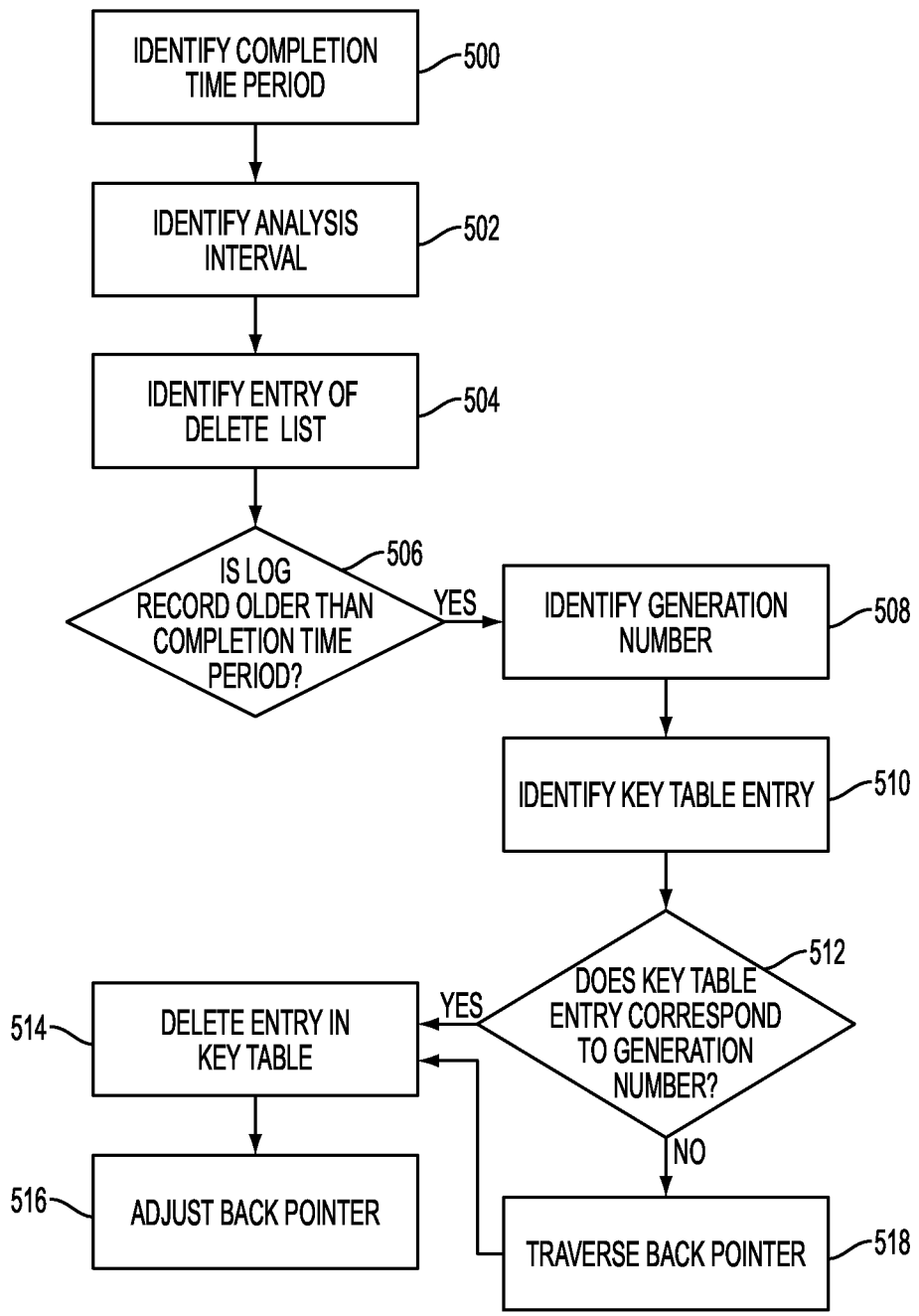
FIG. 5 illustrates a flow chart of an example method of deleting log records according to an embodiment.

FIG. 5 illustrates a flow chart of an example method of deleting one or more log records according to an embodiment. As illustrated by FIG. 5, a completion time period may be identified 500. A completion time period may be a certain period of time relative to a user deletion request within which a delete request is to be honored. For example, referring back to FIG. 1, the period of time between dr and t may be considered the completion time period.

In an embodiment, an analysis interval may be identified 502. An analysis interval may be a time period before which a delete request cannot be processed. For example, referring to FIG. 1, the time period between dr and i may be considered the analysis interval.

The deletion pipeline may identify 504 an entry in the delete list. It may be determined 506 whether a log record associated with the identified entry is older than the identified completion time period. For example, if a completion time period is sixty days, the deletion pipeline may determine whether a log record was created more than sixty days ago.

If it is determined 506 that the log record is older than the completion time period, then the deletion pipeline may use the associated key table index from the delete list to identify 508 a generation number associated with the log record. The deletion pipeline may use the associated key table index to identify 510 a corresponding key table entry. The deletion pipeline may determine 512 whether the identified key table entry corresponds to the identified generation number. If so, the deletion pipeline may delete 514 the entry in the key table, and may adjust 516 the back pointers as necessary.

In an embodiment, if the identified key table entry does not correspond to the identified generation number, the deletion pipeline may traverse 518 one or more back pointers until it locates the entry in the key table that corresponds to the identified generation number. The deletion pipeline may delete 514 the entry in the key table, and may adjust 516 the back pointers as necessary.

Figure 8:
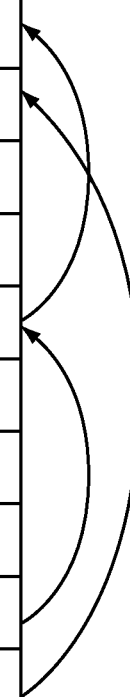
FIG. 8 illustrates an example key table according to an embodiment.

For example, the user activity associated with entry 218 of the user activity table may be deleted, and this entry may be older than the analysis interval time. The deletion pipeline may look up its index, "544", in the user activity table, and may use this index to locate the corresponding key in the key table (i.e., Key B). The deletion pipeline may delete Key B associated with the entry in the key table, and may adjust the back pointers so that the subsequent entry for the user identifier 222 points back to the previous entry for the user identifier 224. FIG. 8 illustrates an example Key Table after the key associated with entry 220 has been deleted from the key table according to an embodiment.

Figure 6:
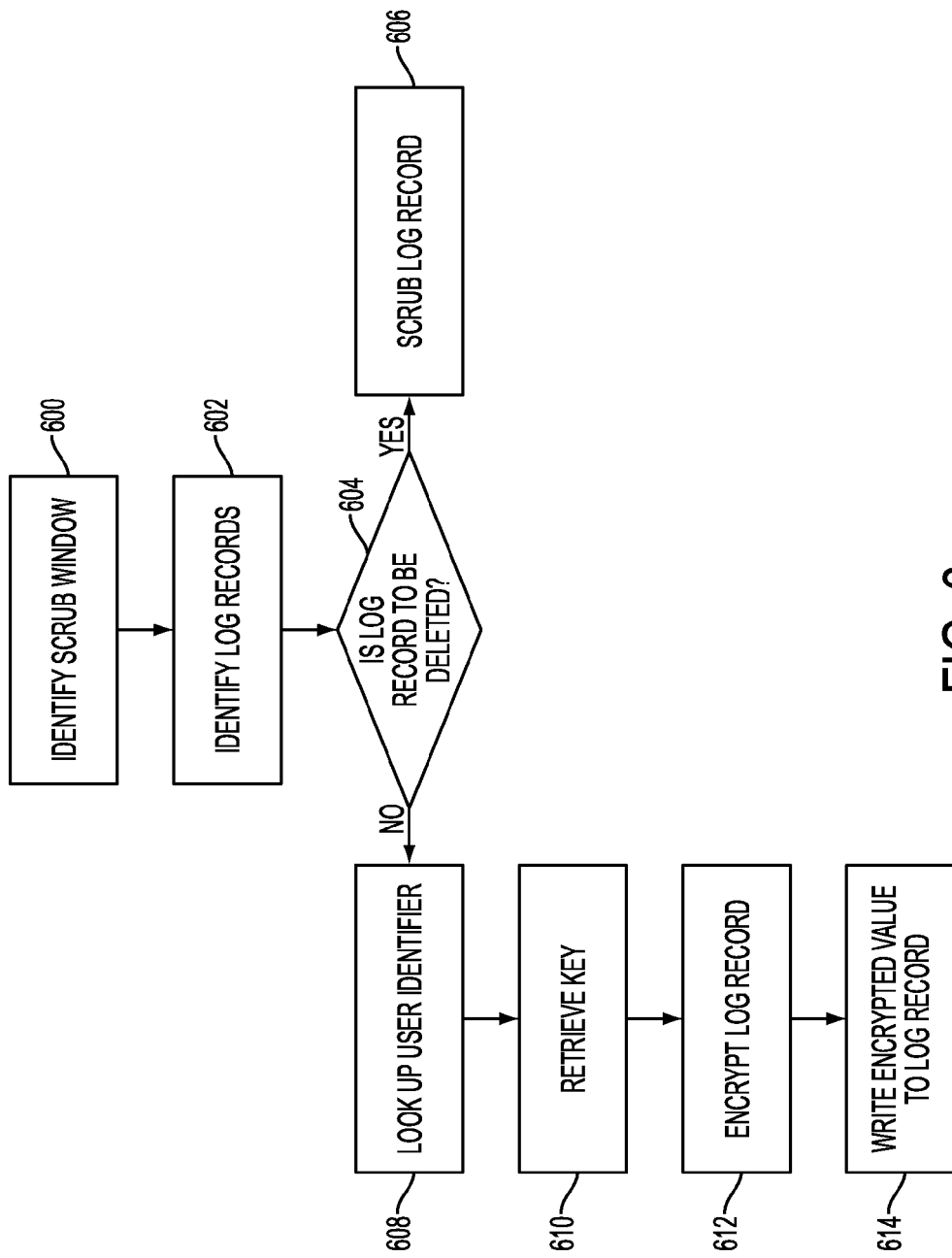
FIG. 6 illustrates a flow chart of an example method of scrubbing one or more log records according to an embodiment.

FIG. 6 illustrates a flow chart of an example method of scrubbing one or more log records according to an embodiment. As illustrated by FIG. 6, a scrub window may be identified 600. A scrub window may be a time period that occurs after completion of an analysis interval but before the completion of a completion time period. For instance, if a completion time period is sixty days from a deletion request, and an analysis interval is thirty days from the deletion request, a scrub window may include one or more records that are affected by the deletion request and are more than thirty days old, but less than or equal to sixty days old.

In an embodiment, one or more log records that were created within the scrub window may be identified 602. For each identified log record, it may be determined 604 whether the log record is to be deleted. For example, it may be determined whether an identified log record is included on the delete list. If it is, then it may be determined 604 that the log record is to be deleted. If it is not, then it may be determined 604 that the log record is not to be deleted.

If the log record is to be deleted, the deletion pipeline may physically scrub 606 the log record. If the log record is not to be deleted, the deletion pipeline may look up 608 the user identifier associated with the log record in the user activity table, and use the stored index to retrieve 610 the associated key from the key table. For example, referring to FIG. 2, the system may determine that log record 208a is not to be deleted. The deletion pipeline may use the user identifier (User A) and the generation number (g0) of the log record to retrieve the corresponding index (i.e., "0") in the user activity table.

The deletion pipeline may use the index to retrieve 610 the corresponding key from the key table. For instance, using the above example, the deletion pipeline may use the index "0" to retrieve 610 key Key A from the key table. The deletion pipeline may encrypt 612 at least a portion of the log record using the retrieved key and may write 614 the encrypted value and the index value to the log record. In various embodiments, other data that may be stored in a log record may be encrypted using the retrieved key such as, for example, the user identifier. In an embodiment, this content may not include an index or a generation number, as this data may not be included in the encryption process. In an embodiment, processing speed may be based on, at least in part, the amount of the log record content that is encrypted.

In an embodiment, if the deletion pipeline processes a request for multiple deletes then the deletion pipeline may follow back pointers, re-link the entries and erase multiple keys as needed.

The method of deleting user data as described herein provides several safeguards with respect to user privacy. First, the deletion pipeline may be the only system component to have access to the key table. This minimizes the access to keys and user data. Second, in this system, the user identifier is not stored with its key. Instead, an index to the key table is stored in log records, a user activity table, and/or the like. Third, once a key is deleted from the key table, the log data associated with the corresponding key table entry is unknowable. And lastly, even if the key table were somehow compromised, the user identifier of a deleted record could not be inferred because the key table entry for a deleted record has no back pointers to other keys for the user identifier.

In situations in which the systems discussed here collect personal information about users, or may make use of personal information, the users may be provided with an opportunity to control whether programs or features collect user information, or to control whether and/or how to receive content that may be more relevant to the user. In addition, certain data may be treated in one or more ways before it is stored or used so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected and/or stored about the user and used by the system.

Figure 7:
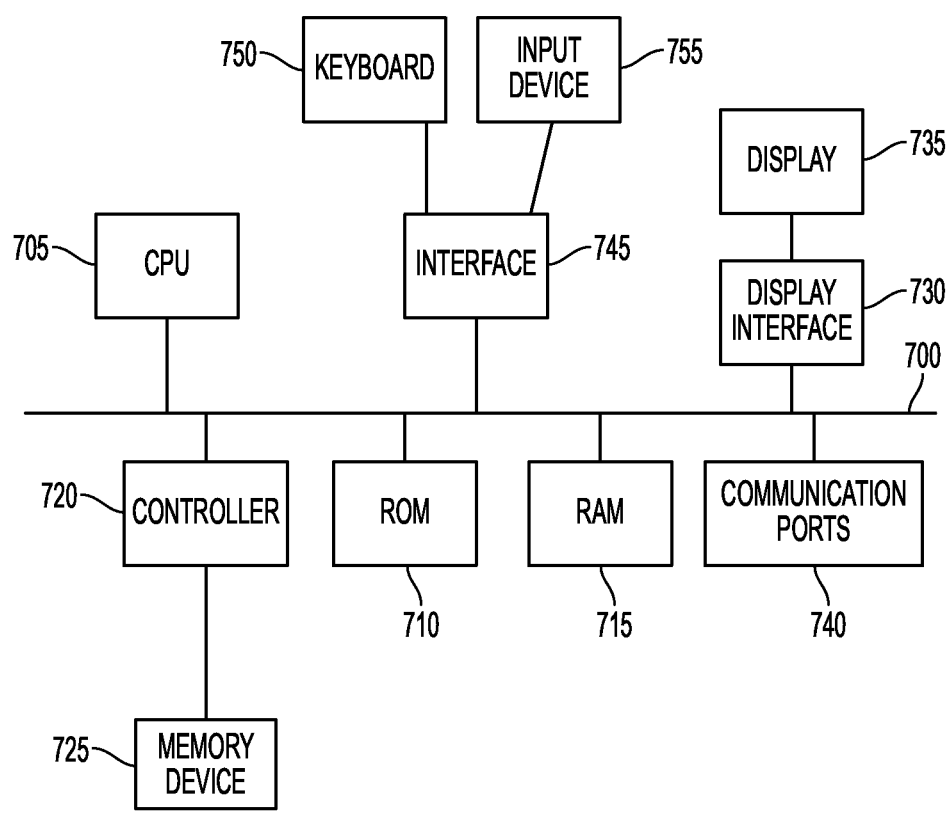
FIG. 7 illustrates a block diagram of example hardware that may be used to contain or implement program instructions according to an embodiment.

FIG. 7 depicts a block diagram of hardware that may be used to contain or implement program instructions. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an example of a computer, computing device or processor as such terms are used within this disclosure. Read only memory (ROM) 710 and random access memory (RAM) 715 constitute examples of non-transitory computer-readable storage media.

A controller 720 interfaces with one or more optional non-transitory computer-readable storage media 725 to the system bus 700. These storage media 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible non-transitory computer-readable medium such as a compact disk, a digital disk, flash memory, a memory card, a USB drive, an optical disc storage medium and/or other recording medium.

An optional display interface 730 may permit information from the bus 700 to be displayed on the display 735 in audio, visual, graphic or alphanumeric format. Communication with external devices, such as a printing device, may occur using various communication ports 740. A communication port 740 may be attached to a communication network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of deleting log records, the method comprising:
    identifying, by a computing device from a log record database, a plurality of log records generated during a time period, wherein each log record corresponds to a user activity;

for each identified log record:
    determining, by the computing device, whether a delete request associated with the log record has been made, and
    in response to determining that a delete request has not been received:
        identifying a unique identifier associated with the log record,
        searching a user activity table for an entry having a key table index associated with the unique identifier, wherein the entry is associated with a timestamp,
        using the key table index and the timestamp to identify a key associated with the unique identifier and the timestamp from a key table,
        encrypting, by the computing device, at least a portion of the log record with the identified key to generate an encrypted value, and
        storing the encrypted value as an entry in the log record database that is associated with the identified log record;
for each entry in the user activity table:
    generating the key table index associated with the entry, wherein the key table index corresponds to an entry in the key table,
    generating a random key associated with the entry,
    storing the random key in the key table at the key table index,
    determining whether the entry includes a delete request, and
    in response to determining that the entry includes a delete request, adding the delete request and a timestamp of a log record associated with the delete request to a delete list.

2. The method of claim 1, wherein identifying a plurality of log records generated during a time period comprises identifying a plurality of log records that are generated after an end of an analysis interval but before an end of a completion time period.

3. The method of claim 1, wherein encrypting at least a portion of the log record with the identified key to generate an encrypted value, comprises encrypting one or more of the following:
    the user identifier, and
    the user activity.

4. The method of claim 1, further comprising:
    receiving a second delete request, wherein the second delete request indicates that the log record is to be deleted;
    identifying a unique identifier and a timestamp associated with the log record;
    searching the user activity table for a key table index associated with the unique identifier of the record to be deleted;
    using the key table index to identify an entry in the key table that corresponds to the timestamp of the log record; and
    deleting a key associated with the identified entry from the key table.

5. The method of claim 4, wherein deleting the key comprises:
    identifying a first back pointer from the identified entry to a previous entry in the key table;
    identifying a second back pointer from a subsequent entry in the key table to the identified entry;
    deleting the first back pointer; and
    adjusting the second back pointer so that it points at the previous entry in the key table.

6. The method of claim 4, wherein the second delete request comprises one or more of the following:
    a request to delete a certain web activity action; and
    a request to delete a user account.

7. The method of claim 1, further comprising:
receiving a second delete request, wherein the second delete request indicates that the log record is to be deleted;
identifying, based on the second delete request, a plurality of log records to be deleted;
for each of the plurality of log records to be deleted:
    identifying a unique identifier and a timestamp associated with the log record to be deleted,
    searching the user activity table for an entry having a key table index associated with the unique identifier of the record to be deleted,
    using the key table index associated with the entry to identify an entry in the key table that corresponds to the timestamp associated with the log record, and
    deleting a key associated with the identified entry from the key table.

8. The method of claim 7, wherein deleting the key comprises:
    identifying a first back pointer from the identified entry to a previous entry in the key table;
    identifying a second back pointer from a subsequent entry in the key table to the identified entry;
    deleting the first back pointer; and
    adjusting the second back pointer so that it points at the previous entry in the key table.

9. The method of claim 1, wherein determining whether a delete request associated with the log record has been made comprises determining whether the delete request is present on the delete list.

10. A system of deleting log records, the system comprising:
    a computing device; and
    a computer-readable storage medium in communication with the computing device, wherein the computer-readable storage medium comprises one or more programming instructions that, when executed, cause the computing device to:
        identify a plurality of log records generated during a time period, wherein each log record corresponds to a user activity,
        for each identified log record:
            determine whether a delete request associated with the log record has been made,
            in response to determining that a delete request has not been received:
                identifying a unique identifier associated with the log record,
                searching a user activity table for an entry having a key table index associated with the unique identifier, wherein the entry is associated with a timestamp,
                using the key table index and timestamp to identify a key associated with the unique identifier and the timestamp from a key table,
                encrypting, by the computing device, at least a portion of the log record with the identified key to generate an encrypted value, and
                storing the encrypted value as an entry in the log record database that is associated with the identified log record, and for each entry in the user activity table:
- generate the key table index associated with the entry, wherein the key table index corresponds to an entry in the key table,
- generate a random key associated with the entry,
- store the random key in the key table at the key table index,
- determine whether the entry includes a delete request, and
- in response to determining that the entry includes a delete request, add the delete request and a timestamp of a log record associated with the delete request to a delete list.

11. The system of claim 10, wherein the one or more programming instructions that, when executed, cause the computing device to identify a plurality of log records generated during a time period comprise one or more programming instructions that, when executed, cause the computing device to identify a plurality of log records that are generated after an end of an analysis interval but before an end of a completion time period.

12. The system of claim 10, wherein the one or more programming instructions that, when executed, cause the computing device to encrypt at least a portion of the log record with the identified key to generate an encrypted value comprises one or more programming instructions that, when executed, cause the computing device to encrypt one or more of the following:
- the user identifier, and
- the user activity.

13. The system of claim 10, wherein the computer-readable storage medium further comprises one or more programming instructions that, when executed, cause the computing device to:
- receive a second delete request, wherein the second delete request indicates that the log record is to be deleted;
- identify a unique identifier and a timestamp associated with the log record;
- search the user activity table for a key table index associated with the unique identifier of the record to be deleted;
- use the key table index to identify an entry in the key table that corresponds to the timestamp of the log record; and
- delete a key associated with the identified entry from the key table.

14. The system of claim 13, wherein the one or more programming instructions that, when executed, cause the computing device to delete the key comprise one or more programming instructions that, when executed, cause the computing device to:
- identify a first back pointer from the identified entry to a previous entry in the key table;
- identify a second back pointer from a subsequent entry in the key table to the identified entry;
- delete the first back pointer; and
- adjust the second back pointer so that it points at the previous entry in the key table.

15. The system of claim 13, wherein the second delete request comprises one or more of the following:
- a request to delete a certain web activity action; and
- a request to delete a user account.

16. The system of claim 10, wherein the computer-readable storage medium further comprises one or more programming instructions that, when executed, cause the computing device to:
- receive a second delete request, wherein the second delete request indicates that the log record is to be deleted;
- identify, based on the second delete request, a plurality of log records to be deleted;
- for each of the plurality of log records to be deleted:
  - identify a unique identifier and a timestamp associated with the log record to be deleted,
  - search the user activity table for an entry having key table index associated with the unique identifier,
  - use the key table index to identify an entry in the key table that corresponds to the timestamp associated with the log record to be deleted, and
  - delete a key associated with the identified entry from the key table.

17. The system of claim 16, wherein the one or more programming instructions that, when executed, cause the computing device to delete the key comprise one or more programming instructions that, when executed, cause the computing device to:
- identify a first back pointer from the identified entry to a previous entry in the key table;
- identify a second back pointer from a subsequent entry in the key table to the identified entry;
- delete the first back pointer; and
- adjust the second back pointer so that it points at the previous entry in the key table.

18. The system of claim 10, wherein the one or more programming instructions that, when executed, cause the computing device to determine whether a delete request associated with the log record has been made comprise one or more programming instructions that, when executed, cause the computing device to determine whether the delete request is present on the delete list.

* * * * *